US010877256B2

(12) United States Patent
Hirata et al.

(10) Patent No.: US 10,877,256 B2
(45) Date of Patent: Dec. 29, 2020

(54) OBSERVATION DEVICE

(71) Applicant: OLYMPUS CORPORATION, Tokyo (JP)

(72) Inventors: Tadashi Hirata, Tokyo (JP); Shintaro Takahashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 235 days.

(21) Appl. No.: 15/984,949

(22) Filed: May 21, 2018

(65) Prior Publication Data
US 2018/0267285 A1 Sep. 20, 2018

Related U.S. Application Data

(63) Continuation of application No. PCT/JP2015/085479, filed on Dec. 18, 2015.

(51) Int. Cl.
G02B 21/08 (2006.01)
G02B 21/24 (2006.01)
(Continued)

(52) U.S. Cl.
CPC ............ *G02B 21/088* (2013.01); *G02B 21/14* (2013.01); *G02B 21/24* (2013.01); *G02B 21/04* (2013.01)

(58) Field of Classification Search
CPC ...... G02B 21/04; G02B 21/088; G02B 21/14; G02B 21/24; G01N 21/01
See application file for complete search history.

(56) References Cited

U.S. PATENT DOCUMENTS 5,038,258 A 8/1991 Koch et al.
5,751,475 A 5/1998 Ishiwata et al.
(Continued)

FOREIGN PATENT DOCUMENTS

EP 1 553 166 A1 7/2005
EP 1615061 A1 1/2006
(Continued)

OTHER PUBLICATIONS

International Search Report dated Dec. 19, 2017 issued in International Application No. PCT/JP2017/033820 together with a partial English language translation.
(Continued)

*Primary Examiner* — Cara E Rakowski
(74) *Attorney, Agent, or Firm* — Scully, Scott, Murphy & Presser, P.C.

(57) ABSTRACT

An observation device includes an illuminating optical system that emits illuminating light obliquely upward from below a sample; and an objective optical system that images transmitted light, which is the illuminating light emitted from the illuminating optical system, reflected above the sample, and passed through the sample, the objective optical system imaging the transmitted light below the sample and via a different path from that of the illuminating optical system. The illuminating optical system includes a light source, a mask that restricts light, which is emitted from the light source, to a particular emission region, and a collimating optical system that converts the light restricted by the mask into substantially parallel light, and the illuminating optical system is arranged so that when the region is projected onto a pupil plane of the objective optical system, a projected image of the region partially overlaps a peripheral portion of the pupil.

15 Claims, 10 Drawing Sheets

(51) Int. Cl.
*G02B 21/14* (2006.01)
*G02B 21/04* (2006.01)

(56) References Cited

U.S. PATENT DOCUMENTS

| | | | |
|---|---|---|---|
| 6,025,956 | A | 2/2000 | Nagano et al. |
| 6,643,061 | B2 | 11/2003 | Osa et al. |
| 9,766,445 | B2 | 9/2017 | Kei et al. |
| 2001/0028497 | A1 | 10/2001 | Uhl |
| 2004/0113043 | A1 | 6/2004 | Ishikawa et al. |
| 2005/0105172 | A1 | 5/2005 | Hasegawa et al. |
| 2006/0072190 | A1 | 4/2006 | Okugawa |
| 2007/0177255 | A1 | 8/2007 | Kanegasaki et al. |
| 2008/0201083 | A1 | 8/2008 | Hata et al. |
| 2009/0051901 | A1* | 2/2009 | Shen ................ G01N 21/05 356/73 |
| 2010/0208053 | A1 | 8/2010 | Hasegawa et al. |
| 2011/0089339 | A1 | 4/2011 | Yamashita et al. |
| 2013/0130307 | A1 | 5/2013 | Sugiyama et al. |
| 2013/0156287 | A1 | 6/2013 | Houjou et al. |
| 2013/0229707 | A1 | 9/2013 | Sakaguchi |
| 2014/0333997 | A1 | 11/2014 | Oda |
| 2014/0340476 | A1 | 11/2014 | Sun et al. |
| 2015/0253561 | A1 | 9/2015 | Lee et al. |
| 2015/0264235 | A1 | 9/2015 | Houjou et al. |
| 2015/0362716 | A1 | 12/2015 | Kei et al. |
| 2016/0048011 | A1* | 2/2016 | Suzuki ................ G02B 21/02 348/79 |
| 2017/0261732 | A1* | 9/2017 | Takahashi ............ G02B 21/086 |
| 2017/0355949 | A1 | 12/2017 | Hirata et al. |
| 2018/0329193 | A1 | 11/2018 | Hirata et al. |
| 2020/0088985 | A1 | 3/2020 | Hirata |

FOREIGN PATENT DOCUMENTS

| | | |
|---|---|---|
| EP | 2312367 A1 | 4/2011 |
| EP | 2562245 A1 | 2/2013 |
| EP | 2 955 502 A1 | 12/2015 |
| EP | 3 211 469 A1 | 8/2017 |
| JP | S57-178212 A | 11/1982 |
| JP | H02-232614 A | 9/1990 |
| JP | H02-272412 A | 11/1990 |
| JP | H07-261089 A | 10/1995 |
| JP | H09-0179034 A | 7/1997 |
| JP | 2001-166219 A | 6/2001 |
| JP | 2003-021628 A | 1/2003 |
| JP | 2004-070276 A | 3/2004 |
| JP | 2004-318185 A | 11/2004 |
| JP | 2004-348104 A | 12/2004 |
| JP | 2004-361485 A | 12/2004 |
| JP | 2005-010258 A | 1/2005 |
| JP | 2005-326495 A | 11/2005 |
| JP | 2005-331623 A | 12/2005 |
| JP | 2006-030583 A | 2/2006 |
| JP | 2006-174764 A | 7/2006 |
| JP | 2006-179387 A | 7/2006 |
| JP | 2007-264410 A | 10/2007 |
| JP | 2007-323094 A | 12/2007 |
| JP | 2008-092882 A | 4/2008 |
| JP | 2008-209726 A | 9/2008 |
| JP | 2009-217222 A | 9/2009 |
| JP | 2011-8188 A | 1/2011 |
| JP | 2011-102970 A | 5/2011 |
| JP | 2011-141444 A | 7/2011 |
| JP | 2013-238797 A | 11/2013 |
| JP | 2015-084059 A | 4/2015 |
| JP | 2016-000007 A | 1/2016 |
| JP | 6066110 B2 | 1/2017 |
| JP | 2018-072845 A1 | 5/2018 |
| KR | 10-0813915 B1 | 3/2008 |
| WO | WO 2006/101056 A1 | 9/2006 |
| WO | 2011/132586 A1 | 10/2011 |
| WO | WO 2012/029817 A1 | 3/2012 |
| WO | WO 2013/047315 A1 | 4/2013 |
| WO | WO 2014/038871 A1 | 3/2014 |
| WO | WO 2014/041820 A1 | 3/2014 |
| WO | 2016/158780 A | 10/2016 |

OTHER PUBLICATIONS

Written Opinion of the International Searching Authority received in International Application No. PCT/JP2017/033820 dated Dec. 19, 2017 together with an English language translation.
U.S. Appl. No. 16/364,946, filed Mar. 26, 2019.
Extended Supplementary European Search Report dated Oct. 29, 2018 in European Patent Application No. 16 77 2663.7.
Japanese Office Action dated Dec. 3, 2019 in Japanese Patent Application No. 2017-225493.
Office Action dated Feb. 21, 2019 received in U.S. Appl. No. 15/690,024.
International Search Report dated Mar. 22, 2016 issued in PCT/JP2015/085479.
International Search Report dated Jun. 21, 2016 issued in PCT/JP2016/059686.
International Search Report dated Jun. 28, 2016 issued in PCT/JP2016/059694.
European Search Report dated Dec. 19, 2017 issued in EP 16772661.
Lugmaier Robert A. et al., "Phase contrast and DIC illumination for AFM hybrids", Ultramicroscopy, Elsevier, Amsterdam, NL, vol. 104, No. 3-4, pp. 255-260, ISSN: 0304-3991, cited in Ext. EP SR.
Tim N. Ford et al., "Phase-gradient microscopy in thick tissue with oblique back-illumination", Nature Methods, vol. 9, No. 12, pp. 1195-1197, ISSN: 1548-7091, cited in Ext. EP SR.
K.F. Webb et al., "Condenser-free contrast methods for transmitted-light microscopy: Condenser-free contrast methods", Journal of Microscopy, vol. 257, No. 1, pp. 8-22, ISSN: 0022-2720, cited in Ext. EP SR.
Office Action dated Sep. 7, 2018 received in U.S. Appl. No. 15/607,666.
International Search Report with Written Opinion dated May 8, 2016 issued in International Application No. PCT/JP2015/084805.
International Search Report with Written Opinion dated Aug. 29, 2017 issued in International Application No. PCT/JP2017/019895.
Office Action dated May 18, 2020 received in U.S. Appl. No. 16/003,402.
Chinese Office Action dated Dec. 27, 2019 in Chinese Patent Application No. 201580085163.7.

* cited by examiner

OBSERVATION DEVICE

CROSS-REFERENCE TO RELATED APPLICATIONS

This is a continuation of International Application PCT/JP2015/085479 which is hereby incorporated by reference herein in its entirety.

TECHNICAL FIELD

The present invention relates to an observation device.

BACKGROUND ART

A known example of a device for observing a subject, such as cells, without labeling is an observation device that employs a phase-contrast observation technique or a differential interference contrast observation technique (for example, refer to PTL 1).

CITATION LIST

Patent Literature

{PTL 1} Japanese Unexamined Patent Application, Publication No. 7-261089

SUMMARY OF INVENTION

An aspect of the present invention provides an observation device that includes an illuminating optical system that emits illuminating light obliquely upward from below a sample; and an objective optical system that images transmitted light, which is the illuminating light emitted from the illuminating optical system, reflected above the sample, and passed through the sample, the objective optical system imaging the transmitted light below the sample and via a different path from the illuminating optical system. The illuminating optical system includes a light source, a mask that restricts light, which is emitted from the light source, to a particular emission region, and a collimating optical system that converts the light restricted by the mask into substantially parallel light, and the illuminating optical system is arranged so that when the emission region is projected onto a pupil plane of the objective optical system, a projected image of the emission region partially overlaps a peripheral portion of the pupil.

DESCRIPTION OF EMBODIMENTS

An observation device 1 according to a first embodiment of the present invention will now be described with reference to the drawings.

Figure 1:
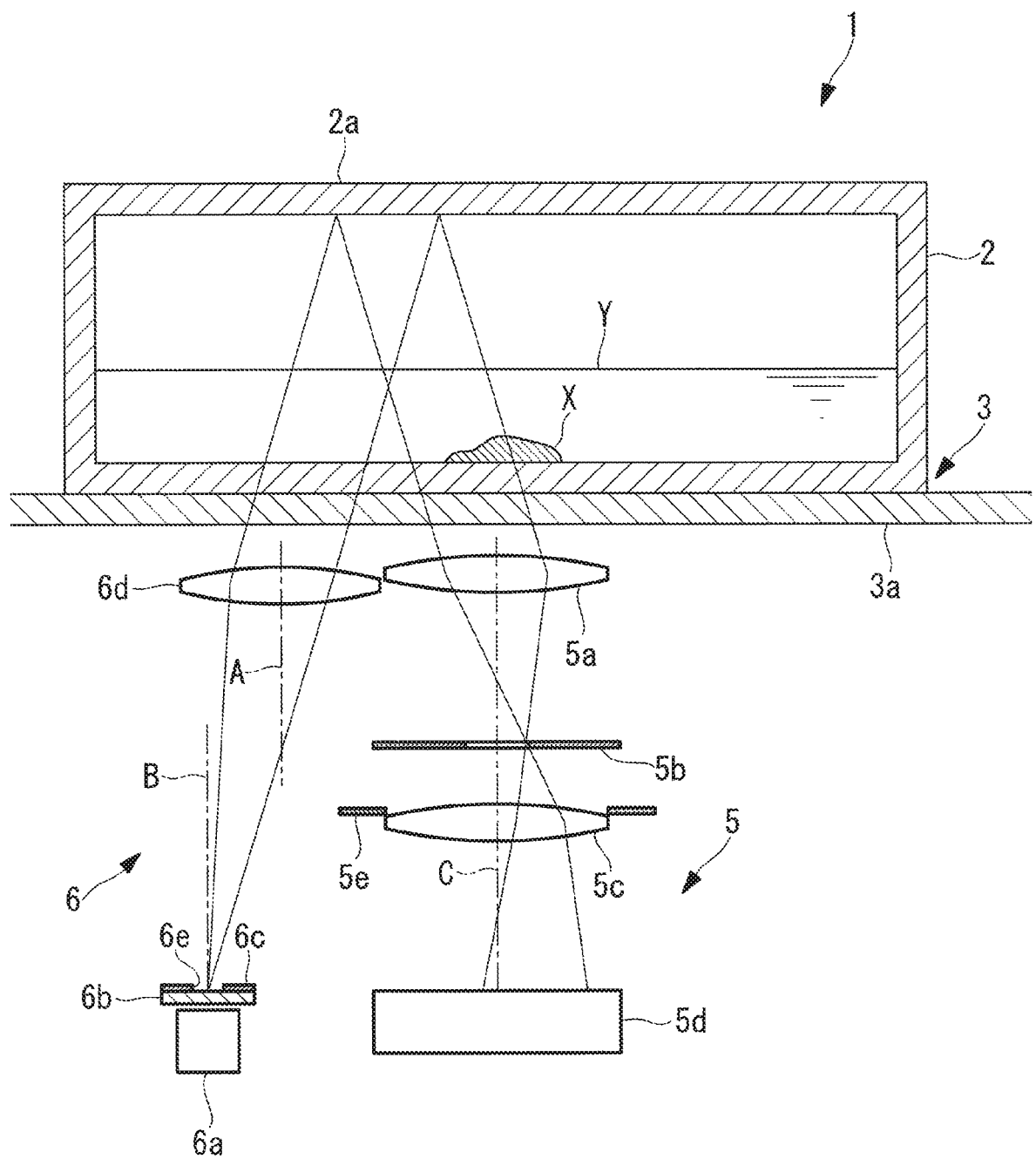
FIG. 1 is a longitudinal sectional view of an observation device according to one embodiment of the present invention.

As illustrated in FIG. 1, the observation device 1 according to this embodiment is equipped with a stage 3 onto which a container 2 containing a sample X, such as cells, is mounted; an objective optical system 5 that images light that has passed through the sample X, the objective optical system 5 being equipped with an objective lens 5a that is disposed under the stage 3 and focuses light that has passed through the stage 3 from above; and an illuminating optical system 6 that emits illuminating light upward through the stage 3, the illuminating optical system 6 having a different path from the objective optical system 5 and disposed on a radially outer side of the objective optical system 5.

The stage 3 is equipped with a mount table 3a composed of an optically transparent material, for example, glass, so as to cover the objective optical system 5 and the illuminating optical system 6 from above, and the container 2 is to be placed on the upper surface of the mount table 3a.

The container 2 is, for example, a cell culture flask having a top plate 2a, and is entirely composed of an optically transparent resin.

As illustrated in FIG. 1, the illuminating optical system 6 is equipped with an LED light source (light source) 6a disposed on the outer side of the objective optical system 5; a diffusing plate 6b that diffuses light from the LED light source; an illuminating mask (mask) 6c installed onto the diffusing plate 6b so as to restrict the illuminating light from the LED light source 6a to a particular emission region; and a collimating lens (collimating optical system) 6d that converts the illuminating light, which emanates from the restricted emission region and gradually diffuses, into substantially parallel light.

Figure 2:
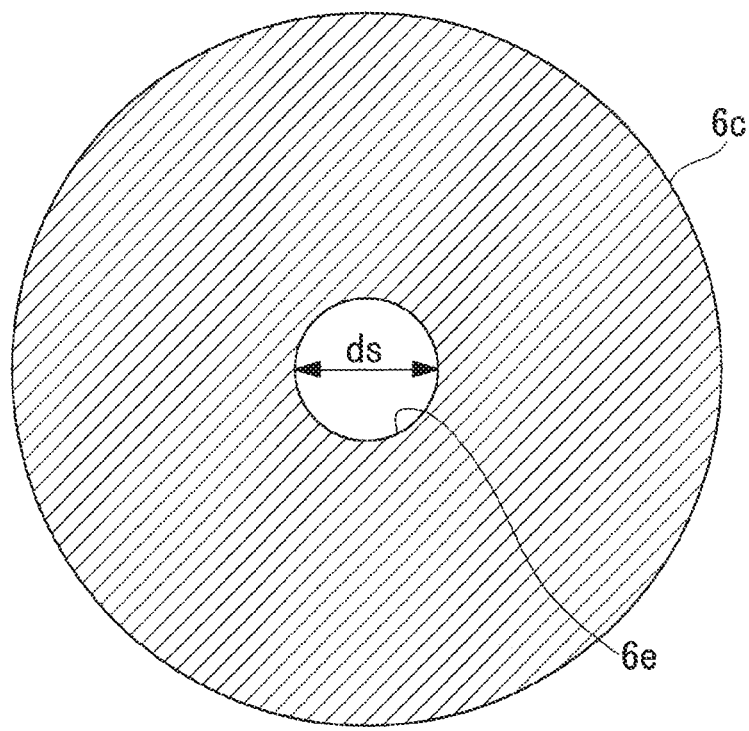
FIG. 2 is a front view of one example of an illuminating mask installed in the observation device illustrated in FIG. 1.

As illustrated in FIG. 2, the illuminating mask 6c has a circular aperture 6e (emission region), through which the illuminating light passes, formed in a light-blocking member.

The collimating lens 6d is arranged such that the optical axis A of the collimating lens 6d is shifted in a horizontal direction with respect to the center axis B of the illuminating mask 6c so that the transmitted light incident on the objective optical system 5 after being reflected by the top plate 2a of the container 2 is inclined with respect to the objective optical system 5 and serves as oblique illumination.

When the amount of shift is assumed to be y, and the focal length of the collimating lens 6d is assumed to be Fi, the angle θ of the illuminating light, which is converted into substantially parallel light by the collimating lens 6d and emitted obliquely upward, with respect to the vertical direction is given as follows:

$$\theta = y/Fi$$

Figure 3:
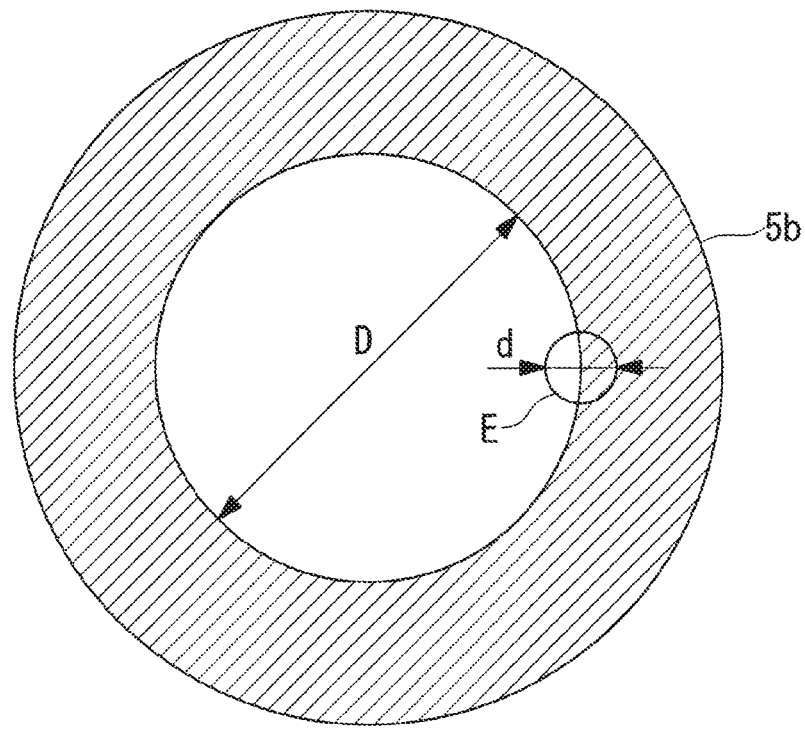
FIG. 3 is a front view showing the relationship between a light stop installed in the observation device illustrated in FIG. 1 and the position of the incident light beam.

Furthermore, as illustrated in FIG. 3, when the pupil diameter of a light stop 5b installed at the pupil plane of the objective optical system 5 is assumed to be D, and a width of a light beam E in a direction in which the illuminating light is inclined with respect to the optical axis C of the objective optical system 5 is assumed to be d, the following conditional formula (1) is satisfied:

$$0.05 \leq d/D \leq 0.4 \quad (1)$$

In this manner, observation can be conducted with a high-contrast image free of brightness unevenness. When d/D is below the lower limit of conditional formula (1), the image is easily affected by vignetting that occurs inside the objective optical system 5, and brightness unevenness is likely to occur. Moreover, dust and scratches on the lens surfaces inside the objective optical system 5 are projected onto the image and become readily noticeable. When d/D exceeds the upper limit of the conditional formula, the contrast of the sample X is decreased, and it becomes difficult to observe the sample X.

The following equations are used to derive d and D.

$$d = ds \cdot Fop/Fi$$

$$D = 2NA \cdot Fop$$

Here, ds is the size (the diameter in the example illustrated in FIG. 2) of the aperture 6e of the illuminating mask 6c in a direction in which the illuminating light is obliquely emitted, Fop is the focal length on the sample X-side of the pupil of the objective lens 5a, and NAo is the numerical aperture on the sample X-side of the objective lens 5a.

By modifying these, conditional formula (2) is satisfied.

$$0.1 \leq ds/(NAo \cdot Fi) \leq 0.8 \quad (2)$$

Furthermore, in order to impart contrast to the image of the sample X, part of the light beam of the illuminating light projected onto the pupil plane of the objective optical system 5 preferably overlaps the periphery of the pupil of the objective optical system 5 (the periphery of the light stop). The optimum condition is that the light beam is so positioned that the center of the transmitted light coming into the objective optical system 5 from obliquely above is coincident with the periphery of the pupil.

This condition is satisfied when conditional formula (3) below is satisfied.

$$NAo - ds \cdot Fi/2Fop^2 \leq \theta \leq NAo + ds \cdot Fi/2Fop^2 \quad (3)$$

When the angle θ is below the lower limit of conditional formula (3), the contrast of the image of the sample X is decreased, and observation becomes difficult. In contrast, when the angle θ exceeds the upper limit of conditional formula (3), the image of the sample X is obtained as a dark-field image, the field of view becomes dark, and, thus, it becomes difficult to clearly observe the contour of the sample X.

The operation of the observation device 1 according to this embodiment configured as such will now be described.

As the illuminating light emitted from the LED light source 6a of the illuminating optical system 6 passes through the illuminating mask 6c, the illuminating light forms a light beam restricted to the emission region having a particular size and is emitted upward; and as the light beam passes through the collimating lens 6d disposed above, the light beam is converted into substantially parallel light and forms a light beam inclined toward the optical axis C of the objective optical system 5.

The substantially parallel light emanating obliquely upward from the collimating lens 6d passes through the mount table 3a constituting the stage 3, the bottom surface of the container 2, and liquid Y, is reflected by the top plate 2a of the container 2, and serves as oblique illumination illuminating as the sample X disposed obliquely below is irradiated from obliquely above. Then, after the transmitted light, which has passed through the sample X, passes through the bottom surface of the container 2 and the mount table 3a, the transmitted light is focused by the objective lens 5a, an image is formed by an imaging lens 5c, and the image is captured by an imaging element 5d.

In other words, of the illuminating light composed of substantially parallel light passing through the sample X from obliquely above, transmitted light that has passed through the sample X is focused by the objective lens 5a. Transmitted light that has passed through a region where the sample X is absent is not refracted and is incident on the objective lens 5a while remaining as the substantially parallel light; thus, after an image of the aperture 6e of the illuminating mask 6c, which is in a state in which a portion thereof overlaps the periphery of the light stop 5b disposed at the pupil plane of the objective lens 5a, is projected, the transmitted light that has passed through the light stop 5b and a flare stop 5e is formed into an image by the imaging lens 5c, and the image is captured by the imaging element 5d.

The transmitted light that has passed through a region where the sample X is present is refracted since the refractive index of the sample X is different from the refractive index of the surroundings.

Figure 4:
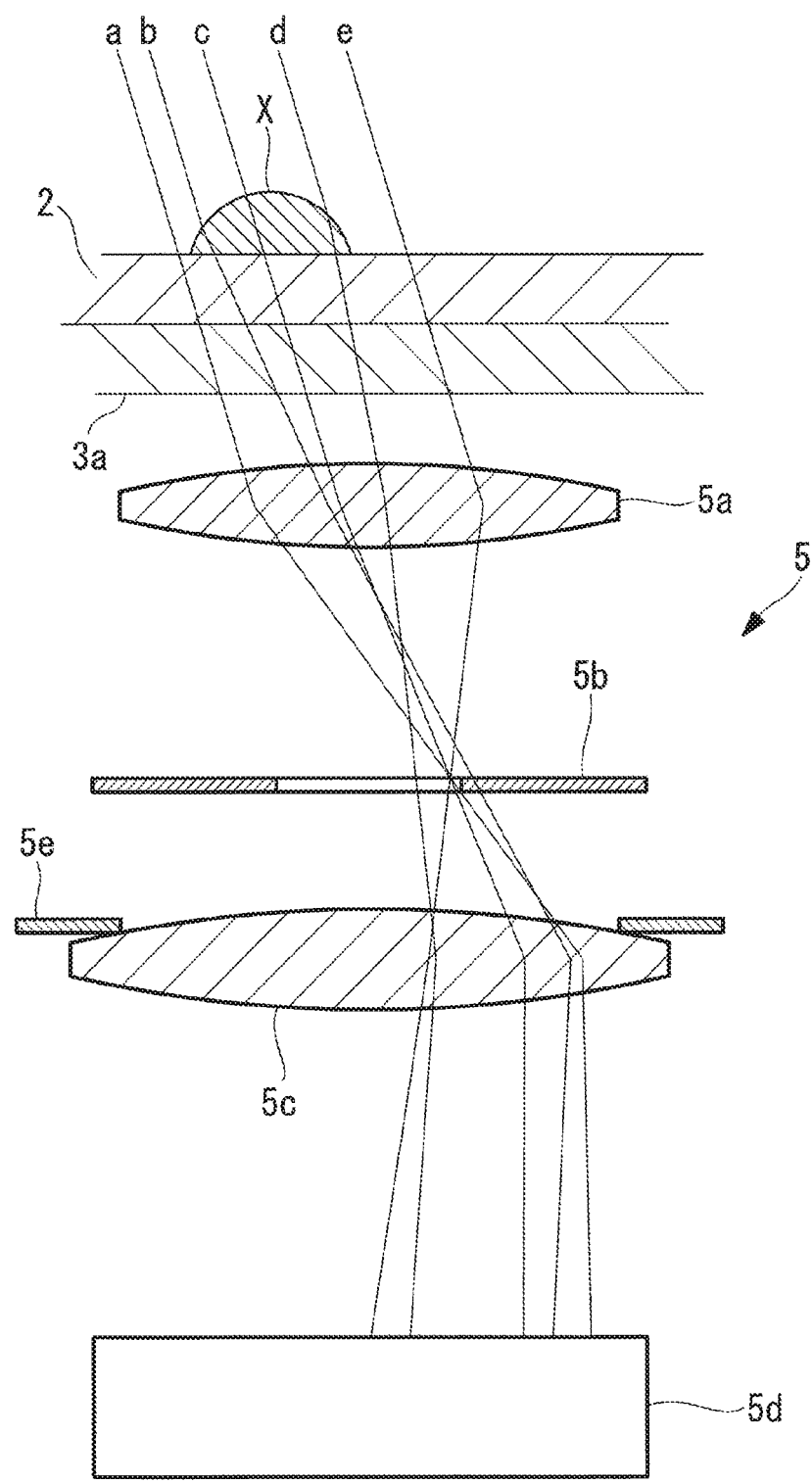
FIG. 4 is a longitudinal sectional view of an objective optical system and illustrates operation of the observation device illustrated in FIG. 1.

In FIG. 4, light rays a and e that do not pass through the sample X and a light ray c orthogonally incident on the surface of the sample X are not refracted, and pass through the inner side of the periphery of the light stop 5b; thus, these light rays form a bright image.

Meanwhile, a light ray b that has passed through the left end of the sample X in FIG. 4 is refracted and blocked by the periphery of the light stop 5b.

Moreover, a light ray d that has passed through the right end of the sample X in FIG. 4 is refracted and is made to pass through a region closer to the center of the light stop 5b, and thus forms a bright image through the imaging lens 5c.

Figure 5:
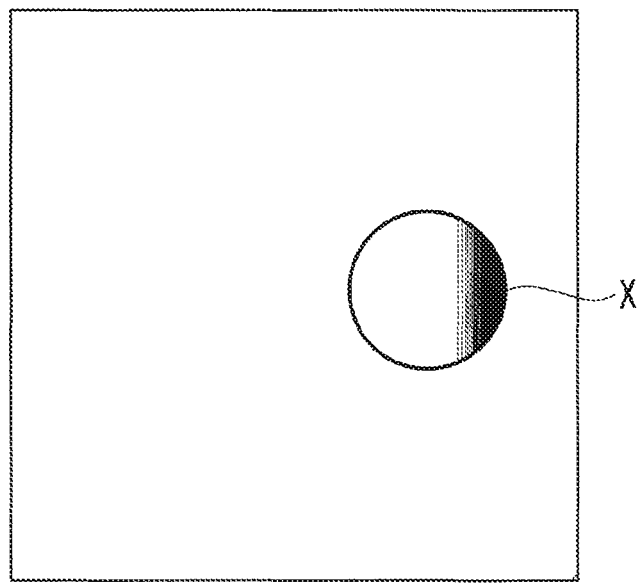
FIG. 5 is a diagram illustrating an example of an image of a sample acquired by the observation device illustrated in FIG. 1.

As a result, as illustrated in FIG. 5, a high-contrast image free of brightness unevenness can be obtained with shading on the sample X. In other words, since shades make the sample X appear three-dimensional, the ease of observation is improved.

Figure 6:
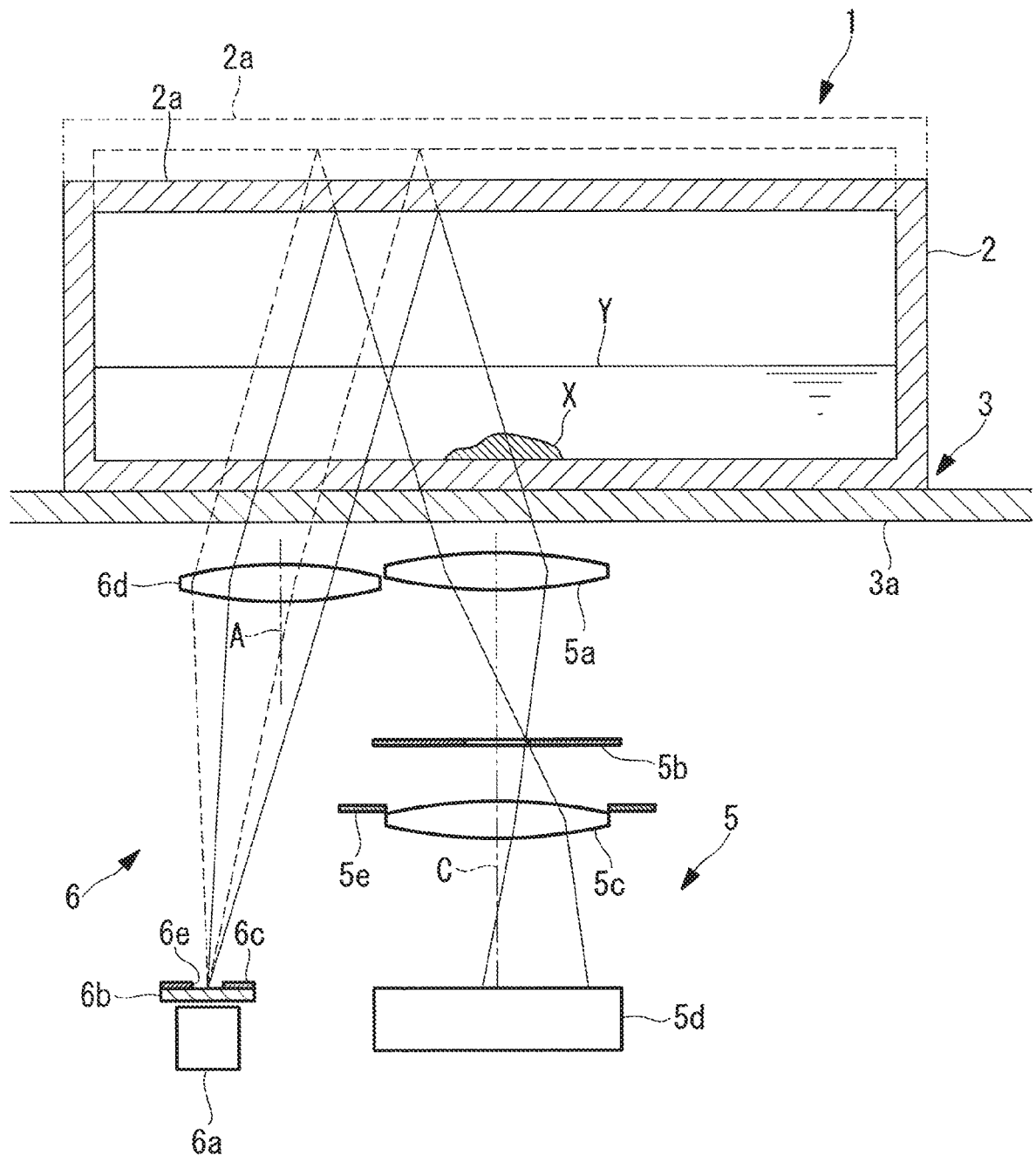
FIG. 6 is a longitudinal sectional view illustrating another effect of the observation device illustrated in FIG. 1.

In this case, this embodiment offers an advantage in that, since the illuminating light converted into substantially parallel light by the collimating lens 6d is emitted obliquely upward, there is no need to change the inclination angle of the illuminating light entering the objective optical system 5 even when a container 2 having a top plate 2a with a different height is mounted onto the stage 3, as illustrated in FIG. 6. In other words, even when the height of the container 2 is varied, there is no need to change the position where the light beam of the transmitted light is incident on the pupil plane of the objective optical system 5; thus, the arrangement in which the light beam incident on the pupil plane partially overlaps the light stop 5b can be maintained, and an image of the sample X with contrast can be observed.

Figure 7:
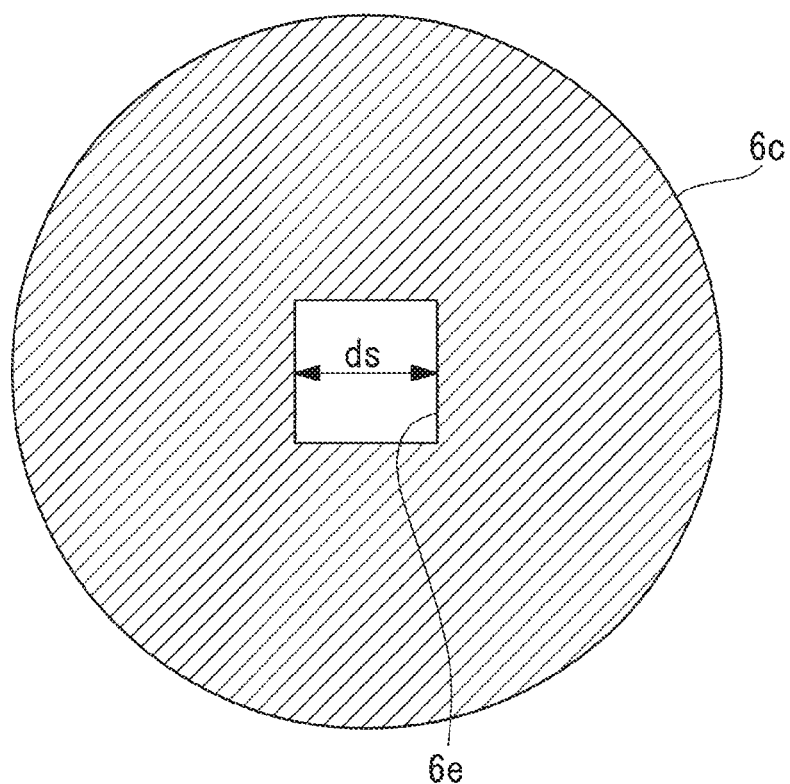
FIG. 7 is a front view of a modification of the illuminating mask illustrated in FIG. 2.

Note that in this embodiment, an illuminating mask having a circular aperture 6e is described as the illuminating mask 6c as an example; alternatively, as illustrated in FIG. 7, an illuminating mask having a rectangular aperture 6e having a width ds in a direction in which the illuminating light inclines may be employed.

Figure 8:
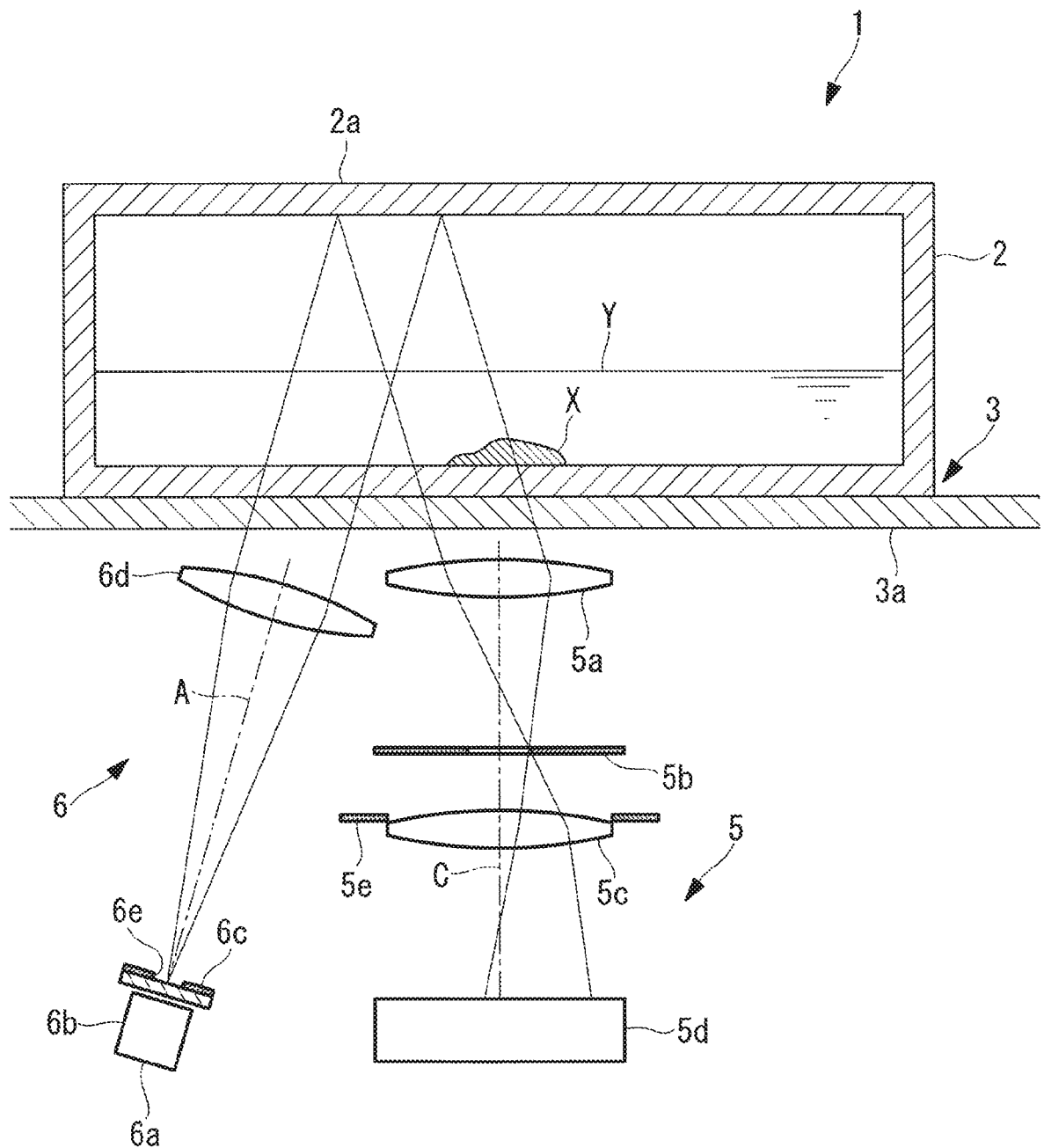
FIG. 8 is a longitudinal sectional view illustrating another modification of the observation device illustrated in FIG. 1.
Figure 9:
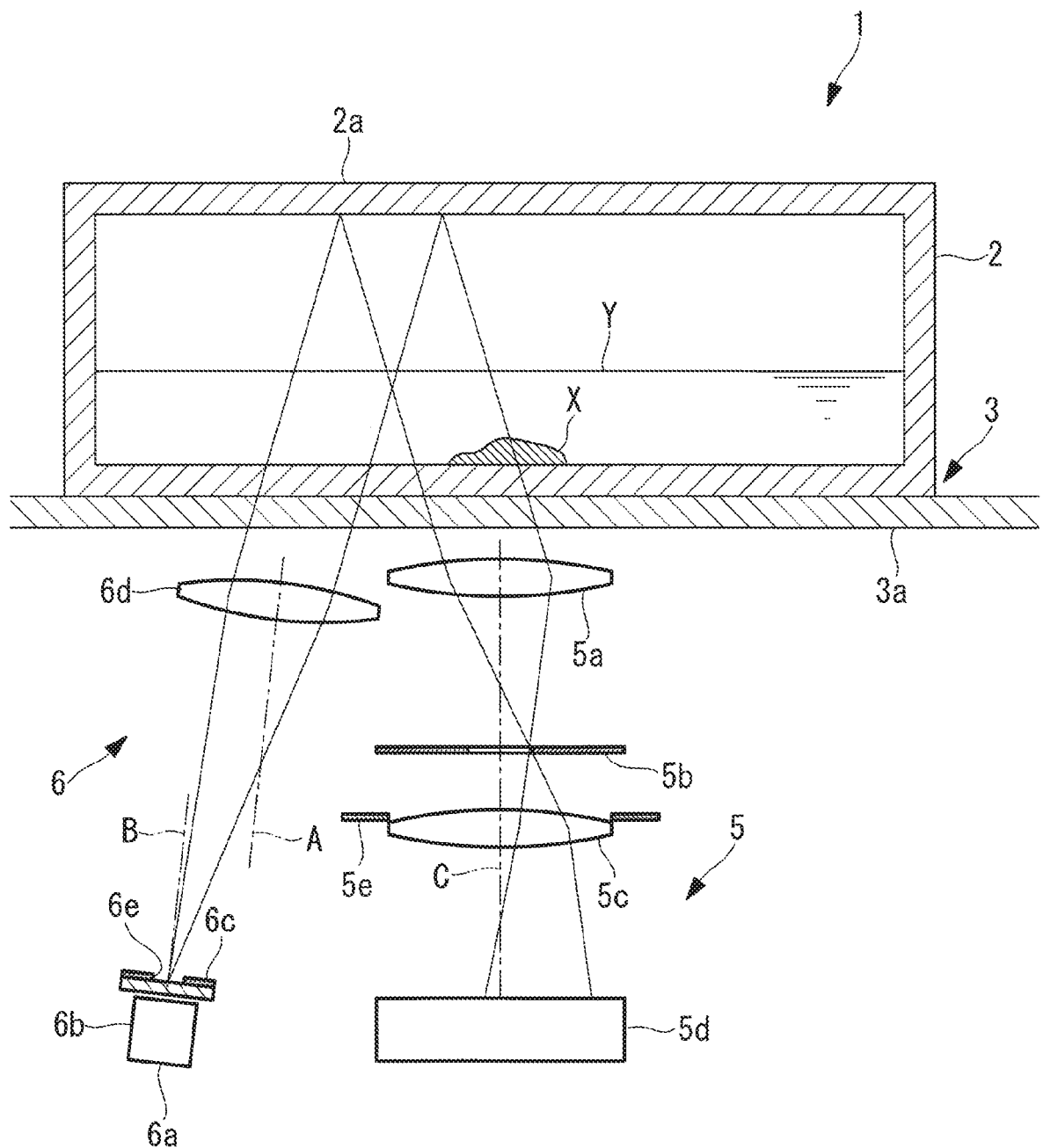
FIG. 9 is a longitudinal sectional view illustrating another modification of the observation device illustrated in FIG. 1.

Moreover, in this embodiment, the optical axis A of the collimating lens 6d is set to be parallel to the optical axis C of the objective lens 5a, and the center axis B of the illuminating mask 6c is shifted in a horizontal direction so as to incline the illuminating light emitted obliquely upward from the collimating lens 6d; alternatively, as illustrated in FIGS. 8 and 9, the optical axis A of the collimating lens 6d may be inclined with respect to the optical axis C of the objective optical system 5.

In the example illustrated in FIG. 8, the inclined optical axis A of the collimating lens 6d is set to be coincident with the center axis B of the illuminating mask 6c. In the example illustrated in FIG. 9, the center axis B of the illuminating mask 6c is shifted with respect to the inclined optical axis A of the collimating lens 6d by shifting the center axis B in a direction orthogonal to the optical axis A.

In this case, the following conditional formula is established:

$$\theta = \alpha + y/Fi$$

where $\alpha$ is an inclination of the optical axis A of the collimating lens 6d with respect to the optical axis C of the objective optical system 5.

In this manner, since the illuminating light passes near the optical axis A of the collimating lens 6d, compared to the case illustrated in FIG. 1, an advantage is afforded in that occurrence of aberration is suppressed, and a high-quality parallel light beam can be obtained throughout the entire light beam region. Moreover, by shifting both the optical axis A and the optical axis B as illustrated in FIG. 9, the amount of inclination of the collimating lens 6d can be decreased, and thus, size reduction can be achieved due to a smaller installation space.

Figure 10:
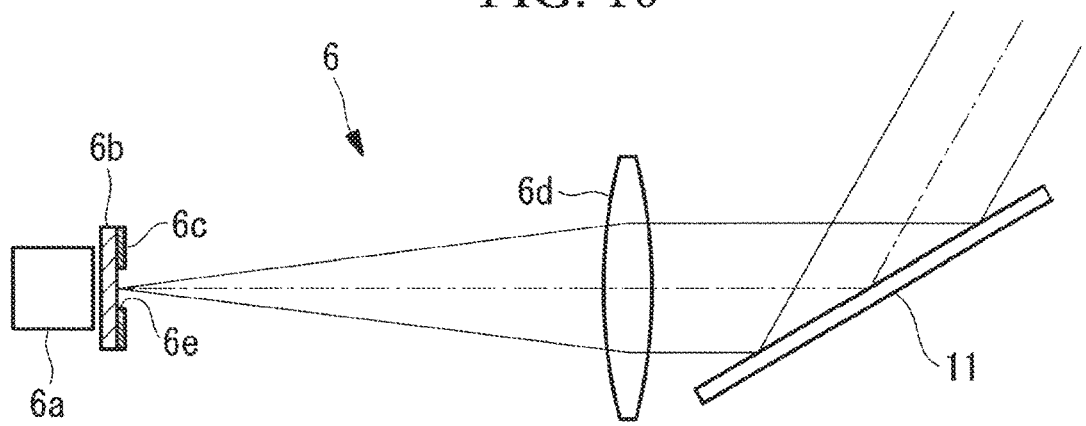
FIG. 10 is a diagram illustrating a modification of an illuminating optical system installed in the observation device illustrated in FIG. 1.
Figure 11:
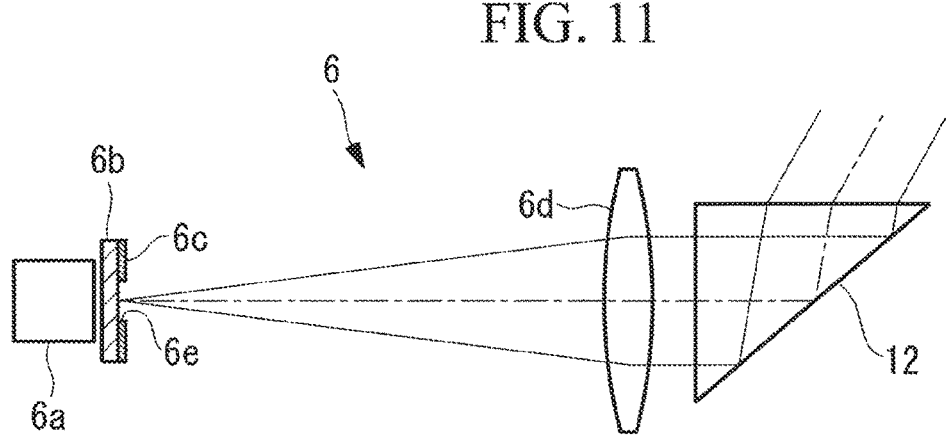
FIG. 11 is a diagram illustrating another different modification of the illuminating optical system installed in the observation device illustrated in FIG. 1.
Figure 12:
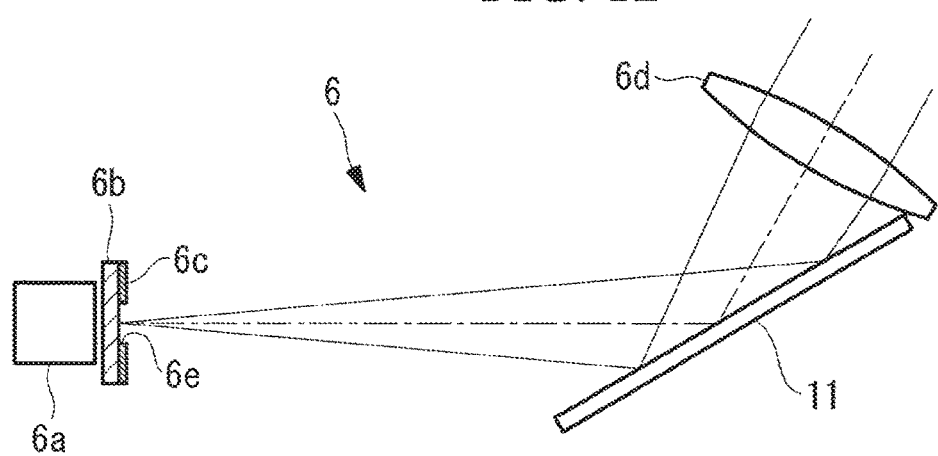
FIG. 12 is a diagram illustrating another modification of the illuminating optical system installed in the observation device illustrated in FIG. 1.

A method that involves deflecting the substantially parallel light, which is emitted in a horizontal direction by the collimating lens 6d, by using a mirror 11 having an elevation smaller than 45° as illustrated in FIG. 10, or by using a prism 12 as illustrated in FIG. 11 may be employed as a method for inclining the illuminating light. As illustrated in FIG. 12, the mirror 11 or the prism 12 may be disposed between the LED light source 6a and the collimating lens 6d.

Figure 13:
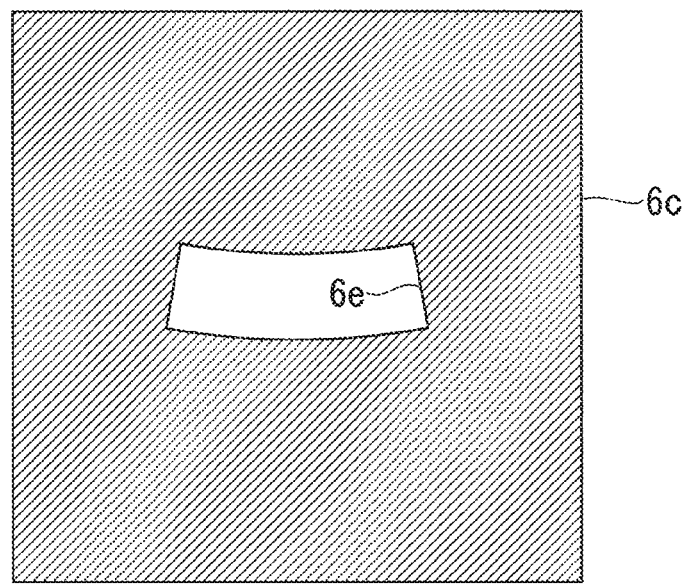
FIG. 13 is a front view of another modification of an illuminating mask illustrated in FIG. 2.

Moreover, the shape of the emission region formed by the aperture 6e in the illuminating mask 6c may be, as illustrated in FIG. 13, an arc shape or a fan shape formed by cutting out one part of a ring. The emission region may be arranged so that when the emission region is projected onto the pupil plane, part on the radially outer side overlaps the periphery of the light stop 5b.

An advantage of employing the emission region having such a shape is that the illuminating light is incident on the objective optical system 5 not only from one direction but also from various directions, and thus the influence of the vignetting inside the objective optical system 5 can be reduced, and occurrence of brightness unevenness can be suppressed while maintaining the contrast.

Figure 14:
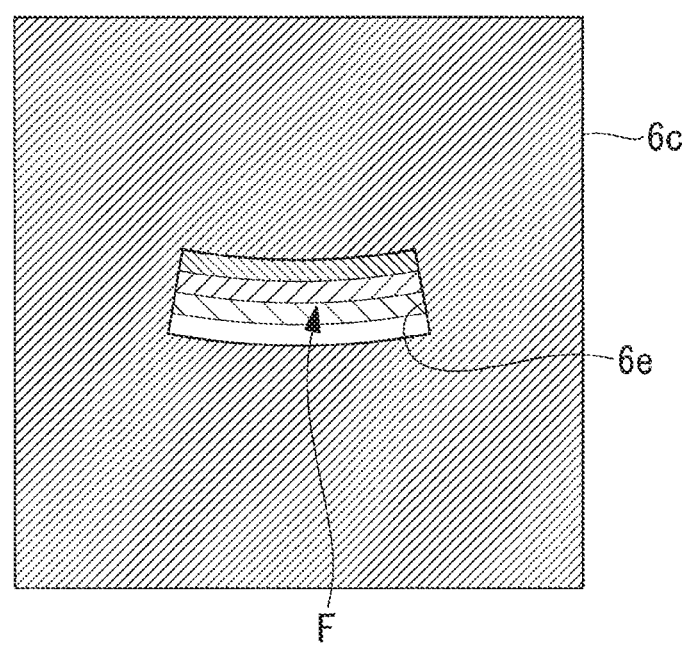
FIG. 14 is a front view of another modification of the illuminating mask illustrated in FIG. 2.

Moreover, when the emission region having such a shape is employed, as illustrated in FIG. 14, the emission region may include a light attenuation portion F that has a transmittance gradient such that the transmittance increases toward the radially outer side. In this manner, darkening of the peripheral portions of the image due to vignetting in the objective optical system 5 can be compensated for.

Moreover, when the emission region having such a shape is employed, the emission region may include a light attenuation portion F that has a transmittance gradient such that the transmittance decreases toward the radially outer side, unlike the one illustrated in FIG. 14. In this manner, the contrast of the cells can be improved.

The above-described embodiment leads to the following invention.

An aspect of the present invention provides an observation device that includes an illuminating optical system that emits illuminating light obliquely upward from below a sample; and an objective optical system that images transmitted light, which is the illuminating light emitted from the illuminating optical system, reflected above the sample, and passed through the sample, the objective optical system imaging the transmitted light below the sample and via a different path from the illuminating optical system. The illuminating optical system includes a light source, a mask that restricts light, which is emitted from the light source, to a particular emission region, and a collimating optical system that converts the light restricted by the mask into substantially parallel light, and the illuminating optical system is arranged so that when the emission region is projected onto a pupil plane of the objective optical system, a projected image of the emission region partially overlaps a peripheral portion of the pupil.

According to this embodiment, the illuminating light emitted from the light source is emitted obliquely upward from below the sample, and then is reflected above the sample so that the illuminating light passes through the sample from above the sample toward below the sample. The transmitted light that has passed through the sample is imaged by the objective optical system, which is disposed below the sample and has a different path from that of the illuminating optical system. Since both the light source unit and the objective optical system are disposed below the sample, a subject, such as cells, can be observed by imaging the transmitted light without labeling the subject and without increasing the size of the device.

In addition, the light emitted from the light source forms illuminating light whose emission region is restricted by the mask, and irradiates the sample, and after the illuminating light is converted into substantially parallel light by the collimating optical system, the substantially parallel light is reflected above the sample and is incident in the vicinity of the pupil plane of the objective optical system below the sample. Since the illuminating light, which has been converted into substantially parallel light by the collimating optical system, is reflected above the sample, there is no need to change the angle of the transmitted light incident on the objective optical system even when the height of the reflection position is varied. As a result, even when the height of the reflection position is varied, adjustment of the position of the light source is not necessary, and the robustness of the observation device can be improved.

In the aspect described above, conditional formula (1) may be satisfied.

$$0.05 \leq d/D \leq 0.4 \quad (1)$$

where D is a pupil diameter of the objective optical system, and d is a light beam diameter when the emission region is projected onto the pupil plane.

In this manner, observation can be conducted through a high-contrast image free of brightness unevenness. When d/D is below the lower limit of conditional formula (1), the image is easily affected by vignetting that occurs inside the objective optical system, and brightness unevenness is likely to occur. Moreover, dust and scratches on the lens surfaces inside the objective optical system are projected onto the image and become readily noticeable. When d/D exceeds the upper limit of the conditional formula, the contrast of the sample is decreased, and it becomes difficult to observe the specimen.

In the aspect described above, conditional formula (2) may be satisfied:

$$0.1 \leq ds/(NAo \cdot Fi) \leq 0.8 \quad (2)$$

where ds is a size of the emission region in a direction in which illuminating light emitted from the illuminating optical system is inclined, Fi is a focal length of the collimating optical system, and NAo is a numerical aperture on the sample side of the objective optical system.

In the aspect described above, conditional formula (3) may be satisfied:

$$NAo - ds \cdot Fi/2Fop^2 \leq \theta \leq NAo + ds \cdot Fi/2Fop^2 \quad (3)$$

where ds is a size of the emission region in a direction in which illuminating light emitted from the illuminating optical system is inclined, Fi is a focal length of the collimating optical system, NAo is a numerical aperture on the sample side of the objective optical system, Fop is a focal length from on the sample side of the pupil of the objective optical system, and θ is an inclination angle of the illuminating light, which has been converted into substantially parallel light by the collimating optical system, with respect to an optical axis of the objective optical system and at a position of the sample.

In this manner, a part of the light beam of the transmitted light incident on the objective optical system overlaps the periphery of the pupil of the objective optical system, and thus, contrast can be imparted to the image of the sample.

In the aspect described above, the emission region may have a shape that constitutes a part of a ring.

In this manner, since the transmitted light is incident on the objective optical system from various directions, the influence of vignetting in the objective optical system can be suppressed, and occurrence of brightness unevenness in the image can be reduced while maintaining the contrast.

In the aspect described above, the mask may include a light attenuation portion in which transmittance decreases continuously or in a stepwise manner toward a radially inner side, the light attenuation portion being disposed inside the emission region.

In this manner, illuminating light that is brighter toward the peripheral portion can be formed, and darkening of the peripheral portions of the image due to vignetting in the objective optical system can be compensated for.

In the aspect described above, the mask may include a light attenuation portion in which transmittance increases continuously or in a stepwise manner toward a radially inner side, the light attenuation portion being disposed inside the emission region.

In this manner, the contrast of the cells can be improved.

REFERENCE SIGNS LIST 1 observation device
5 objective optical system
6 illuminating optical system
6a LED light source (light source)
6c illuminating mask (mask)
6d collimating lens (collimating optical system)
6e aperture (emission region)
F light attenuation portion
X sample

The invention claimed is:

1. An observation device comprising:
an illuminating optical system;
an objective optical system; and
a reflection member,
wherein the illuminating optical system emits illuminating light obliquely upward with respect to an optical axis of the objective optical system from below a sample,
the reflection member reflects, above the sample, the illuminating light emitted from the illuminating optical system,
the objective optical system obtains an image of transmitted light, which has been reflected by the reflection member, has passed through the sample, and has been incident on the sample obliquely with respect to the optical axis of the objective optical system, the objective optical system obtaining the image of the transmitted light below the sample and via a different path from the illuminating optical system,
the illuminating optical system includes:
a light source;
a mask that restricts light, which is emitted from the light source, to a particular emission region, the mask having one aperture at a center thereof, a center of a light beam of the illuminating light, which is projected onto a pupil plane of the objective optical system, from the mask being eccentric with respect to a center of the optical axis of the objective optical system; and
a collimating optical system that converts the light restricted by the mask into substantially parallel light, and
the illuminating optical system is arranged so that when the emission region is projected onto a pupil plane of the objective optical system, a projected image of the emission region partially overlaps a peripheral portion of the pupil.

2. The observation device according to claim 1, wherein conditional formula (1) is satisfied:

$$0.05 \leq d/D \leq 0.4 \quad (1)$$

where D is a pupil diameter of the objective optical system, and d is a light beam diameter when the emission region is projected onto the pupil plane.

3. The observation device according to claim 1, wherein conditional formula (2) is satisfied:

$$0.1 \leq ds/(NAo \cdot Fi) \leq 0.8 \quad (2)$$

where ds is a size of the emission region in a direction in which illuminating light emitted from the illuminating optical system is inclined, Fi is a focal length of the collimating optical system, and NAo is a numerical aperture on the sample side of the objective optical system.

4. The observation device according to claim 1, wherein conditional formula (3) is satisfied:

$$NAo - ds \cdot Fi/2Fop^2 \leq \theta \leq NAo + ds \cdot Fi/2Fop^2 \quad (3)$$

where ds is a size of the emission region in a direction in which illuminating light emitted from the illuminating optical system is inclined, Fi is a focal length of the collimating optical system, NAo is a numerical aperture on the sample side of the objective optical system, Fop is a focal length from on the sample side of the pupil of the objective optical system, and θ is an inclination angle of the illuminating light, which has been converted into substantially parallel light by the collimating optical system, with respect to an optical axis of the objective optical system and at a position of the sample.

5. The observation device according to claim 1, wherein the emission region has a shape that constitutes a part of a ring.

6. The observation device according to claim 5, wherein the mask includes a light attenuation portion in which transmittance decreases continuously or in a stepwise manner toward a radially inner side, the light attenuation portion being disposed inside the emission region.

7. The observation device according to claim 5, wherein the mask includes a light attenuation portion in which transmittance increases continuously or in a stepwise manner toward a radially inner side, the light attenuation portion being disposed inside the emission region.

8. The observation device according to claim 1, wherein the sample is contained in a container which comprises an optically transparent material and includes a top plate above the sample, the top plate reflecting at least a part of light to serve as the reflection member.

9. An observation device comprising:
an illuminating optical system that emits illuminating light obliquely upward from below a sample;
a reflection member that reflects, above the sample, the illuminating light emitted from the illuminating optical system; and
an objective optical system that images transmitted light, which has been reflected by the reflection member, and has passed through the sample, the objective optical system imaging the transmitted light below the sample and via a different path from the illuminating optical system,
wherein the illuminating optical system includes a light source, a mask that restricts light, which is emitted from the light source, to a particular emission region, and a collimating optical system that converts the light restricted by the mask into substantially parallel light,
the illuminating optical system is arranged so that when the emission region is projected onto a pupil plane of the objective optical system, a projected image of the emission region partially overlaps a peripheral portion of the pupil; and
conditional formula $0.05 \leq d/D \leq 0.4$ is satisfied:
where D is a pupil diameter of the objective optical system, and d is a light beam diameter when the emission region is projected onto the pupil plane.

10. An observation device comprising:
an illuminating optical system that emits illuminating light obliquely upward from below a sample;
a reflection member that reflects, above the sample, the illuminating light emitted from the illuminating optical system; and
an objective optical system that images transmitted light, which has been reflected by the reflection member, and has passed through the sample, the objective optical system imaging the transmitted light below the sample and via a different path from the illuminating optical system,
wherein the illuminating optical system includes a light source, a mask that restricts light, which is emitted from the light source, to a particular emission region, and a collimating optical system that converts the light restricted by the mask into substantially parallel light,
the illuminating optical system is arranged so that when the emission region is projected onto a pupil plane of the objective optical system, a projected image of the emission region partially overlaps a peripheral portion of the pupil; and
conditional formula $0.1 \leq ds/(NAo \cdot Fi) \leq 0.8$ is satisfied:
where ds is a size of the emission region in a direction in which illuminating light emitted from the illuminating optical system is inclined, Fi is a focal length of the collimating optical system, and NAo is a numerical aperture on the sample side of the objective optical system.

11. An observation device comprising:
an illuminating optical system that emits illuminating light obliquely upward from below a sample;
a reflection member that reflects, above the sample, the illuminating light emitted from the illuminating optical system; and
an objective optical system that images transmitted light, which has been reflected by the reflection member, and has passed through the sample, the objective optical system imaging the transmitted light below the sample and via a different path from the illuminating optical system,
wherein the illuminating optical system includes a light source, a mask that restricts light, which is emitted from the light source, to a particular emission region, and a collimating optical system that converts the light restricted by the mask into substantially parallel light,
the illuminating optical system is arranged so that when the emission region is projected onto a pupil plane of the objective optical system, a projected image of the emission region partially overlaps a peripheral portion of the pupil; and
conditional formula $NAo - ds \cdot Fi/2Fop^2 \leq \theta \leq NAo + ds \cdot Fi/2Fop^2$ is satisfied:
where ds is a size of the emission region in a direction in which illuminating light emitted from the illuminating optical system is inclined, Fi is a focal length of the collimating optical system, NAo is a numerical aperture on the sample side of the objective optical system, Fop is a focal length from on the sample side of the pupil of the objective optical system, and θ is an inclination angle of the illuminating light, which has been converted into substantially parallel light by the collimating optical system, with respect to an optical axis of the objective optical system and at a position of the sample.

12. An observation device comprising:
an illuminating optical system that emits illuminating light obliquely upward from below a sample;
a reflection member that reflects, above the sample, the illuminating light emitted from the illuminating optical system; and
an objective optical system that images transmitted light, which has been reflected by the reflection member, and has passed through the sample, the objective optical system imaging the transmitted light below the sample and via a different path from the illuminating optical system,
wherein the illuminating optical system includes a light source, a mask that restricts light, which is emitted from the light source, to a particular emission region, and a collimating optical system that converts the light restricted by the mask into substantially parallel light, the illuminating optical system is arranged so that when the emission region is projected onto a pupil plane of the objective optical system, a projected image of the emission region partially overlaps a peripheral portion of the pupil; and the emission region has a shape that constitutes a part of a ring.

13. The observation device according to claim 12, wherein the mask includes a light attenuation portion in which transmittance decreases continuously or in a stepwise manner toward a radially inner side, the light attenuation portion being disposed inside the emission region.

14. The observation device according to claim 12, wherein the mask includes a light attenuation portion in which transmittance increases continuously or in a stepwise manner toward a radially inner side, the light attenuation portion being disposed inside the emission region.

15. An observation device comprising:

an illuminating optical system that emits illuminating light obliquely upward from below a sample;

a reflection member that reflects, above the sample, the illuminating light emitted from the illuminating optical system; and an objective optical system that images transmitted light, which has been reflected by the reflection member, and has passed through the sample, the objective optical system imaging the transmitted light below the sample and via a different path from the illuminating optical system, wherein the illuminating optical system includes a light source, a mask that restricts light, which is emitted from the light source, to a particular emission region, and a collimating optical system that converts the light restricted by the mask into substantially parallel light, the illuminating optical system is arranged so that when the emission region is projected onto a pupil plane of the objective optical system, a projected image of the emission region partially overlaps a peripheral portion of the pupil; and the sample is contained in a container which comprises an optically transparent material and includes a top plate above the sample, the top plate reflecting at least a part of light to serve as the reflection member.

* * * * *